US006868747B2

United States Patent
Göser et al.

(10) Patent No.: US 6,868,747 B2
(45) Date of Patent: Mar. 22, 2005

(54) LINEAR DRIVE

(75) Inventors: Hubert Göser, Dannenberg (DE); Christoph Bederna, Wunstorf (DE)

(73) Assignee: ConiTech Antriebssysteme GmbH, Hannover (DE)

( * ) Notice: Subject to any disclaimer, the term of this patent is extended or adjusted under 35 U.S.C. 154(b) by 108 days.

(21) Appl. No.: 10/175,403

(22) Filed: Jun. 20, 2002

(65) Prior Publication Data

US 2002/0198074 A1 Dec. 26, 2002

(30) Foreign Application Priority Data

Jun. 22, 2001 (DE) .......................................... 101 30 258

(51) Int. Cl.[7] .............................................. F16H 21/16
(52) U.S. Cl. ............................... 74/25; 74/89; 198/833
(58) Field of Search .................................. 474/249, 250; 74/25, 37, 89, 89.2, 89.21, 89.22; 198/833, 834; 400/283, 352, 354

(56) References Cited

U.S. PATENT DOCUMENTS

| | | | | | |
|---|---|---|---|---|---|
| 4,047,444 A | * | 9/1977 | Jeffrey | ........................ | 474/148 |
| 4,586,915 A | * | 5/1986 | Cathey et al. | .............. | 474/205 |
| 4,753,119 A | * | 6/1988 | Kuspert | ..................... | 74/89.21 |
| 4,915,674 A | * | 4/1990 | Tanaka et al. | .............. | 474/153 |
| 5,447,476 A | * | 9/1995 | White, Jr. | ................... | 474/238 |
| 5,704,862 A | * | 1/1998 | Janne et al. | ................ | 474/168 |
| 5,749,800 A | * | 5/1998 | Nagel et al. | ................. | 474/84 |
| 6,705,962 B2 | * | 3/2004 | Schinzel | .................... | 474/140 |

FOREIGN PATENT DOCUMENTS

| DE | 84 26 813 | | 12/1984 | | |
|---|---|---|---|---|---|
| DE | 3724564 A1 | * | 2/1989 | ................. | 474/249 |

* cited by examiner

Primary Examiner—David A. Bucci
Assistant Examiner—Vicky A. Johnson
(74) Attorney, Agent, or Firm—Walter Ottesen

(57) ABSTRACT

A linear drive includes a toothed belt (2) driven by direction-changing rollers (1) in the pretensioned state. The toothed belt (2) has at least one tension reinforcement. The teeth (3) of the belt (2) engage in the teeth gaps (4) of a linear toothed counterpiece (5) over a specific length. The pitch of the teeth (3) of the belt is slightly less, up to 0.8%, than the pitch of the toothed counterpiece (5) in the pretensioned state of the toothed belt (2) and during loading of the toothed belt which occurs during operation under load. The tooth flank (6) of the tooth (3) of the belt is at right angles or almost at right angles to the plane of the tension reinforcement (7) and the tooth gap (4) of the toothed counterpiece (5) is approximately 20% to 80% wider than the width of the tooth (3) of the belt. The belt teeth (3) are elastically configured compared to the high stiffness of the tension reinforcement (7).

10 Claims, 3 Drawing Sheets

LINEAR DRIVE

BACKGROUND OF THE INVENTION

German utility model registration G 84 26 813.1 discloses a linear drive wherein the conversion of a rotational movement into a linear movement is made with toothed belts. A form-tight meshing engagement is generated by the tooth profile between toothed belt and linear toothed counterpiece whereby a transfer of the rotational movement into a linear movement of the toothed counterpiece is possible. The toothed counterpiece is usually configured as a rack made of steel or the like. Generally, the rack is configured to have a specific length. According to utility model registration G 84 26 813.1, it is also conceivable to use individual rack segments which are separated from each other by gaps.

The toothed belt is usually made of elastomeric material and is, for example, driven by a pinion and is brought into engagement with the toothed counterpiece via direction-changing rollers. With the aid of additionally mounted hold-down rollers, it is ensured that an adequate number of teeth remain in engagement with the toothed counterpiece between the entering end and the exiting end of the toothed belt. The toothed belt is pretensioned by adjusting the direction-changing rollers in that the mutual spacing of the direction-changing rollers is increased.

The known linear drives include a toothed belt having a standard tooth profile which engages in a correspondingly profiled toothed counterpiece of the same pitch.

For force transmission, the toothed belt engages over a predetermined length (the so-called engagement length) in the toothed counterpiece from the entering end up to the exiting end. The force transmission to the toothed counterpiece takes place with a specific thrust force which is proportional to the tooth load.

The toothed belt itself has a specific stiffness which is dependent upon the stiffness of the tension reinforcement (that is, the so-called cord), the cord spacing as well as the width of the toothed belt. The tension reinforcement is disposed in the toothed belt.

A disadvantage of the known linear drives is that a thrust force, which is too high, leads to increased tooth loading. Additionally, the known linear drives have the disadvantage that very large forces occur at the exiting end of the toothed belt, that is, on the pull end at the end of the engagement length. These forces lead to a premature wear of the toothed belt and therefore of the linear drive. Often, disturbing running noises occur.

SUMMARY OF THE INVENTION

It is an object of the invention to provide a linear drive of the kind referred to above wherein an optimal force transfer from the teeth of the toothed belt to the teeth of a linear counterpiece is achieved.

The linear drive of the invention includes: a toothed belt under load during the operation of the linear drive and the toothed belt including a first plurality of teeth having a specific pitch; direction-changing rollers for guiding the toothed belt in a pretensioned state thereon; a linear toothed counterpiece having a second plurality of teeth; the toothed belt being mounted so as to permit the first plurality of teeth to engage the second plurality of teeth over a predetermined engagement length; the pitch of the teeth of the toothed belt being up to 0.8% less than the pitch of the teeth of the toothed counterpiece when the toothed belt is in the pretensioned state and under said load; the toothed belt including tension reinforcement defining a plane; each of the teeth of the first plurality of teeth having a predetermined width and a flank which is perpendicular to or almost perpendicular to the plane; the teeth of the second plurality of teeth having a tooth gap width of approximately 20% to 80% wider than the predetermined width; and, the teeth of said toothed belt being configured to be elastic compared to the high stiffness of the tension reinforcement.

The pitch on the toothed belt is 0.8% less than on the toothed counterpiece. For this reason, the teeth on the force introducing end (that is, at the end of the engagement length) are subjected to less load. It has been shown that for a toothed belt which engages in a linear toothed counterpiece with the same pitch, the highest load occurs on the tooth of the loaded exiting end (that is, on the pull end at the end of the engagement length) and the tooth at the exiting end is subjected to a still higher load for a toothed belt having a greater pitch than the pitch of the linear toothed counterpiece.

With the invention, the loading changes over the engagement length in correspondence to the shortening of the pitch of the belt teeth. For a specific shortening, the tooth loading at the entry end and the exiting end is the same and therefore half as great as for the same pitch of the belt teeth and the linear counterpiece. The pitch of the belt teeth which is needed therefor is also dependent upon the loading and the stiffness of the toothed belt. A further reduction of the pitch of the belt teeth shifts the loading or the force transmission evermore to the load free entering end. This shift operates advantageously because the geometric conditions at the entering end are more favorable.

The tooth flank of the belt tooth is almost at right angles to the plane of the tension reinforcement. For this reason, the following is effected: an optimal force transmission to the linear toothed Counterpiece, a uniform force transfer during tooth engagement, a favorable introduction of tension into the tension reinforcement and a uniform distribution of tension in the belt teeth even for a simultaneous large thrust deformation of the belt teeth.

The pitch of the linear toothed counterpiece is selected to be at least so large that the following do not lead to a larger pitch of the belt teeth than the pitch of the toothed counterpiece: a superposed elastic expansion of the toothed belt because of a pretensioning, a lengthening because of deterioration as well as from manufacturing tolerances of the belt and toothed counterpiece.

The belt teeth are configured to be elastic compared to the high stiffness of the tension reinforcement of the toothed belt. It has been shown that, for a reduction of the tooth loading, the belt longitudinal stiffness must be increased or the thrust stiffness of the teeth must be reduced. The belt teeth are configured to be elastic in accordance with the invention because the longitudinal stiffness of the toothed belt cannot easily be influenced. Because of the thrust force, which occurs in the force transmission, the belt teeth can therefore yield somewhat and bend slightly. Accordingly, the belt teeth can be characterized as being thrust elastic.

A friction-free tooth engagement end disengagement of the belt teeth in the teeth of the counterpiece are obtained. This reduces the running noise to a minimum and protect, the belt teeth. The protection of the belt teeth is an essential precondition for a disturbance-free drive and for a high service life. Furthermore, less maintenance is needed. The linear drive of the invention thereby operates more reliably than conventional linear drives.

According to an advantageous embodiment of the invention, the belt teeth are elastic in such a manner that at least five belt teeth, which engage in the toothed counterpiece, effect a force transfer to the toothed counterpiece notwithstanding the different pitch of the belt teeth and the teeth of the counterpiece.

When a belt tooth engages in a tooth gap of the toothed counterpiece and a force is transmitted to the toothed counterpiece, the belt tooth deforms slightly because of its elasticity in that it bends somewhat. This has the consequence that the pitch of the belt is somewhat changed in some places because the mutual spacing of the belt teeth likewise changes slightly because of the elastic configuration of the belt teeth. In this way, in the linear drive of the invention, several belt teeth engage simultaneously with the toothed counterpiece when the linear drive operates under load.

Preferably, the engagement length of the linear drive is selected to be so large that no geometric jamming occurs at the entry end.

A further embodiment of the invention provides that the flank angle is 80° to 90° for trapezoidally-shaped belt teeth profiles and that, for rounded belt teeth profiles, the flank angle of the mean tangent of the main carrying region lies between 80° and 90°. Hold-down rollers are advantageously not required because of the low dislodging force resulting therefrom.

According to another feature of the invention, the toothed belt includes a profile combination of trapezoidally-shaped and rounded belt teeth.

In a further embodiment of the invention, the flank angle of the toothed counterpiece is somewhat flatter than the flank angle of the corresponding belt tooth. Preferably, the flank angle of the toothed counterpiece is up to 5° flatter than the flank angle of the corresponding belt tooth having a trapezoidally-shaped tooth profile. The flank angle of the toothed counterpiece is preferably up to 5° flatter than the flank angle of the mean tangent of the corresponding belt tooth having a rounded tooth profile.

In an advantageous embodiment of the invention, the linear toothed counterpiece is a rack. The teeth, which engage in the tooth gaps of the toothed counterpiece, belong preferably to the outer teeth of a double-toothed toothed belt and the direction-changing rollers of the toothed belt are configured as toothed wheels.

With one set of teeth, the belt teeth engage in the toothed counterpiece and, with the other set of teeth, the toothed belt is driven via the direction-changing rollers in a manner known per se These direction-changing rollers are configured as toothed wheels.

BRIEF DESCRIPTION OF THE DRAWINGS

The invention will now be described with reference to the drawings wherein.

DESCRIPTION OF THE PREFERRED EMBODIMENTS OF THE INVENTION

Figure 1:
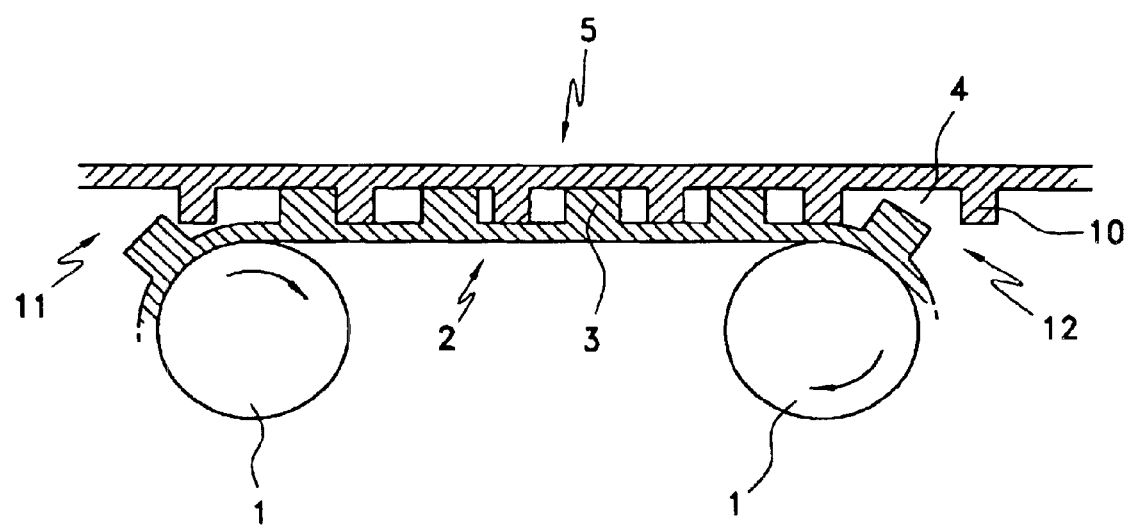
FIG. 1 is a schematic showing the operation of the linear drive according to an embodiment of the invention.

The linear drive shown in FIG. 1 includes a toothed belt 2 which is guided over direction-changing rollers 1 and is moved by a drive (not shown). In FIG. 1, only the upper part of the toothed belt 2 is shown. Actually, the toothed belt 2 also extends further in a lower part thereof, that is, the toothed belt 2 is a continuous belt.

The toothed belt 2 comprises an elastomeric material and has a tension reinforcement (not shown in FIG. 1) made of glass or steel in its interior. The toothed belt 2 is pretensioned in dependence upon the particular application and on the specific type of operation. This takes place in that the distance between the two direction-changing rollers 1 is increased so that the toothed belt 2 is in tension.

Figure 4:
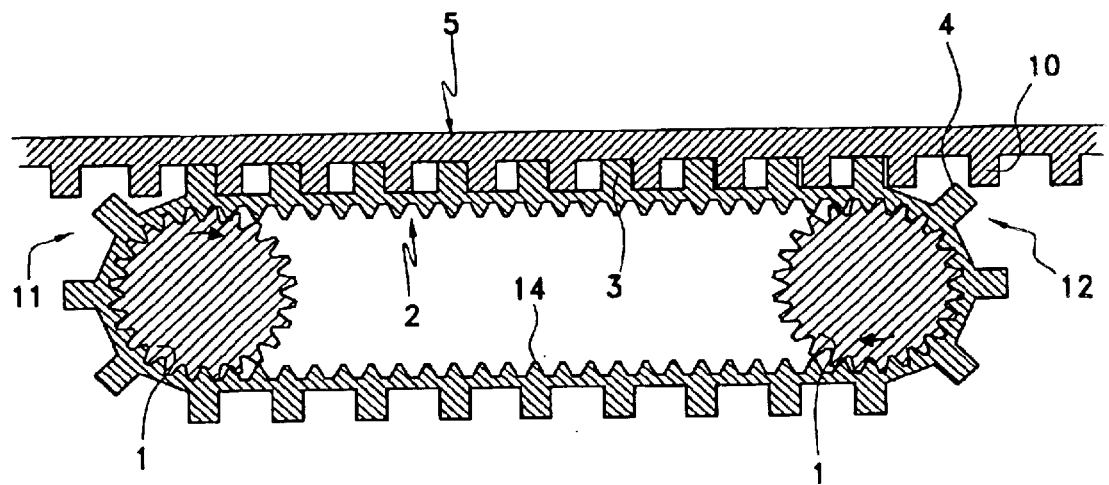
FIG. 4 is a schematic showing the operation of the linear drive according to an embodiment of the invention.

The direction-changing rollers 1 can be configured as toothed wheels in order to drive the toothed belt 2 over at least one direction-changing roller 1. In this case, in addition to the upper teeth shown, the toothed belt has a set of inner teeth as shown in FIG 4. As shown in FIG. 1, the toothed belt 2 can also be driven without toothed wheels, for example, as a consequence of the frictional force between the direction-changing rollers 1 and the toothed belt 2.

For force transmission, the teeth 3 of the toothed belt 2 engage over a so-called engagement length starting from the entering end 11 into the tooth gaps 4 of a linear toothed counterpiece 5 and separate from the toothed counterpiece 5 at the exiting end 12, that is, at the end of the engagement length. The engagement length is freely selectable.

According to the invention, the pitch of the belt teeth 3 is slightly shorter, up to 0.8% than the pitch of the toothed counterpiece 5 in the pretensioned state of the toothed belt 2 and when the loading of the toothed belt occurs during load operation of the linear drive. The toothed counterpiece 5 is preferably configured as a rack made of steel. The shorter pitch of the belt toothed is shown greatly exaggerated in FIG. 1 in order to show the operation.

Figure 2:
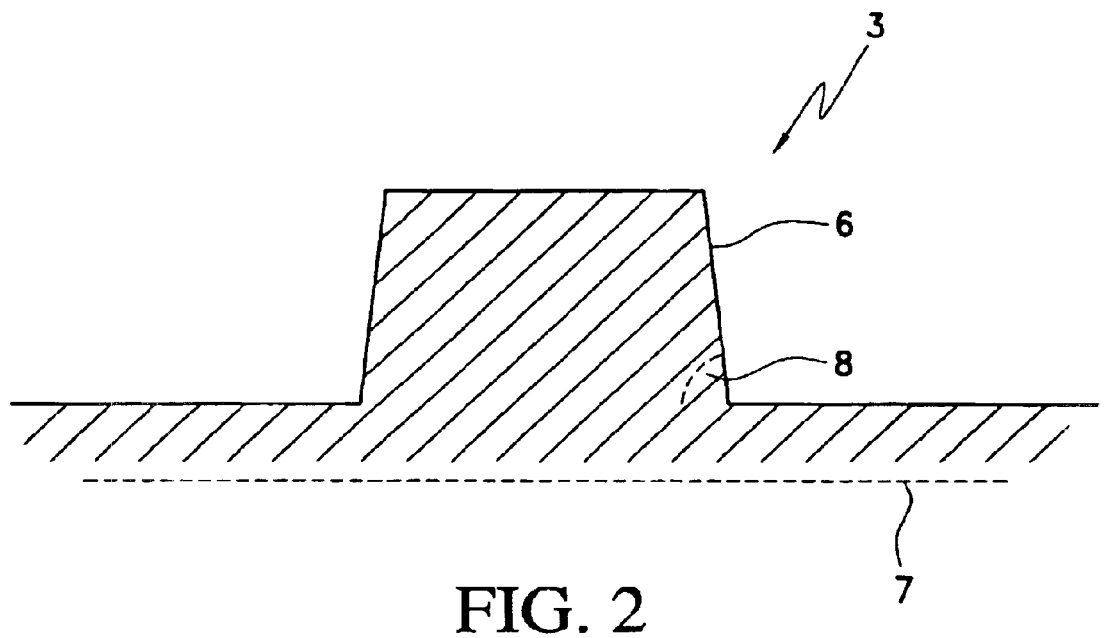
FIG. 2 is a cross section taken through the belt tooth having a trapezoidally-shaped tooth profile.

The tooth flanks 6 of each belt tooth 3 are almost at right angles to the plane of the schematically illustrated tension reinforcement 7, that is, the tension cords, as shown in FIG. 2. Each tooth gap 4 of the toothed counterpiece 5 is almost twice as wide as the width of the belt tooth 3. Preferably, the tooth gap 4 of the toothed counterpiece 5 is approximately 20% to 80% wider than the width of the belt tooth 3.

The force is transmitted from the toothed belt 2 to the linear toothed counterpiece 5 via the tooth profile. The toothed belt 2 has a specific stiffness, which is, inter alia, dependent upon the stiffness of the tension reinforcement 7, that is, the so-called cord, the cord spacing as well as the width of the toothed belt.

In conventional linear drives, very large forces occur at the exiting end 12 of the toothed belt 2 and these forces are almost completely taken up by the belt tooth 3 located there and lead to an exceptionally large loading on this belt tooth 3. Friction forces occur at the exiting end 12 during the separation of the belt tooth 3 and the toothed counterpiece 5. Especially these friction forces lead to an early wear and to an increased susceptibility of the linear drive.

Because of the shorter pitch of the belt tooth distribution of the invention, the teeth at the force introducing end (that is, at the end of the engagement length) are relieved of load. This is shown exaggerated in FIG. 1. The loading of the belt teeth 3 changes over the engagement length in correspondence to the reduction of the pitch of the teeth of the belt.

For a specific reduction, the tooth loading at the entering end and exiting end (11, 12) is the same and therefore approximately half as large as with the same pitch of the teeth of the belt and the toothed counterpiece 5. A further reduction of the pitch of the teeth of the belt shifts the load or force transfer evermore to the entering end 11. The total load lies at the entering end 11 in correspondence to the illustration in FIG. 1. Even this displacement operates advantageously because the geometric conditions are more favorable at the entering end 11.

However, it is much more advantageous to select a pitch according to the invention wherein the force transmission is distributed over the entire engagement length. At least five belt teeth 3 should simultaneously be in engagement with the toothed counterpiece 5. This can be achieved in that the belt teeth 3 are configured elastically compared to the high stiffness of the tension reinforcement 7.

When a force transmission takes place from the belt teeth 3 to the toothed counterpiece 5, a thrust force operates on the teeth 3 of the belt. This thrust force leads to the situation that the elastically configured belt teeth 3 yield somewhat, that is, the belt teeth are thrust elastic. When the belt teeth 3 therefore bend somewhat during the force transmission, the distance to the next adjacent belt teeth changes slightly and this has the consequence that the pitch of the teeth 3 of the belt changes somewhat at some locations. In this way, the situation can be achieved that at least five belt teeth 3 are simultaneously in engagement with the toothed counterpiece 5 when the linear drive operates under load.

In this way, a favorable load distribution is achieved over many belt teeth 3 in engagement with the toothed counterpiece 5. A friction-free meshing engagement and meshing disengagement of the teeth 3 of the belt are achieved with respect to the teeth 10 of the toothed counterpiece 5. This reduces the running noise to a minimum and protects the teeth 3 of the belt. This protection of the teeth 3 of the belt is a significant precondition for a disturbance-free drive and for a long service life. Furthermore, less maintenance is needed. The linear drive according to the invention therefore operates more reliably than conventional linear drives.

Figure 3:
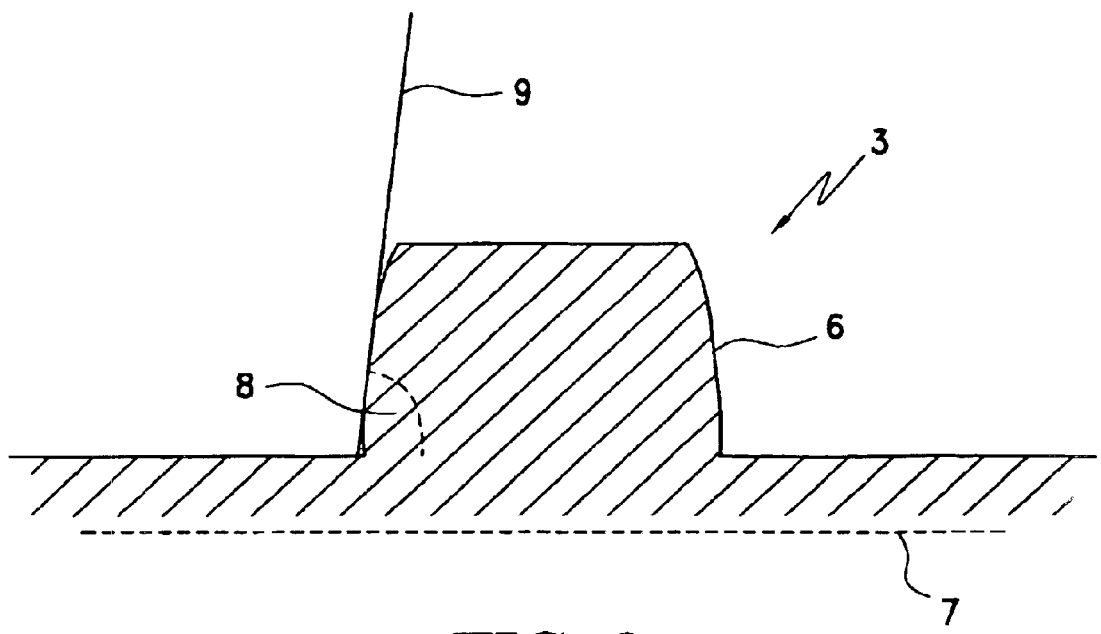
FIG. 3 is a cross section taken through the belt tooth having a rounded tooth profile.

FIG. 2 shows a cross section through a belt tooth 3 having a trapezoidally-shaped tooth profile. The tooth flank 6 is therefore almost at right angles to the plane of the tension reinforcement 7 indicated schematically by a broken line. In FIG. 3, a cross section is shown through a belt tooth 3 having a rounded tooth profile.

The flank angle 8 of the trapezoidally-shaped belt tooth profile shown in FIG. 2 is approximately 85°. In the round belt tooth profile shown in FIG. 3, the flank angle 8 of the mean tangent 9 of the main support region is likewise approximately 85°.

In this way, the following is effected: a uniform force transmission during tooth engagement; a favorable introduction of stress into the tension reinforcement 7; and, a uniform stress distribution in the belt tooth 3 even when there is a simultaneous large thrust deformation.

The toothed counterpiece 5 can be a rack having a finitely determined length. It is also possible to use individual short rack segments which are connected to each other via a linkage. Accordingly, it is conceivable to guide the rack, which comprises the individual segments, about direction-changing means. The entire segment rack can be configured to be continuous.

Referring to FIG. 1, the linear drive of the invention is characterized by the following: that the pitch of the belt teeth 3 in the pretensioned state of the toothed belt 2 and for the loading of the toothed belt occurring during load operation is slightly less (up to 0.8%) than the pitch of the toothed counterpiece 5 in a linear drive of the kind mentioned initially herein; that the tooth flank 6 of the belt tooth 3 is at right angles or almost at right angles to the plane of the tension reinforcement 7; that the tooth gap 4 of the toothed counterpiece 5 is approximately 20% to 80% wider than the width of the belt tooth 3; and, that the belt teeth 3 are configured to be elastic compared to the high stiffness of the tension reinforcement 7.

Referring again to FIG. 4, the first plurality of teeth of the linear drive of the invention may be a first set of teeth 3 formed on the outer side of a toothed belt 2. The toothed belt 2 also has a second set of teeth 14 formed on the inner side thereof and, at least one of the direction-changing rollers 1 may be configured as a toothed wheel in meshing engagement with said second set of teeth 14. In this embodiment, the direction-changing rollers 1 may be two in number and both of the direction-changing rollers may be toothed wheels.

It is understood that the foregoing description is that of the preferred embodiments of the invention and that various changes and modifications may be made thereto without departing from the spirit and scope of the invention as defined in the appended claims.

What is claimed is:

1. A linear drive comprising:
    a toothed belt under load during the operation of the linear drive and said toothed belt including a first plurality of teeth having a specific pitch;
    direction-changing rollers for guiding said toothed belt in a pretensioned state thereon;
    a linear toothed counterpiece having a second plurality of teeth;
    said toothed belt being mounted so as to permit said first plurality of teeth to engage said second plurality of teeth over a predetermined engagement length;
    said pitch of the teeth of said toothed belt being up to 0.8% less than the pitch of the teeth of said toothed counterpiece when said toothed belt is in said pretensioned state and under said load;
    said toothed belt including tension reinforcement defining a plane;
    each of said teeth of said first plurality of teeth having a predetermined width and a flank which is perpendicular to or almost perpendicular to said plane;
    the teeth of said second plurality of teeth having a tooth gap width of approximately 20% to 80% wider than said predetermined width; and,
    said teeth of said toothed belt being configured to be elastic compared to the high stiffness of said tension reinforcement.

2. The linear drive of claim 1, wherein said teeth of said toothed belt are elastic in such a manner that at least five of the teeth of said toothed belt, which are in engagement with said toothed counterpiece in said engagement length, effect a force transfer to said toothed counterpiece notwithstanding the different pitch of said teeth of said toothed belt and the pitch of the teeth of said toothed counterpiece.

3. The linear drive of claim 1, wherein said teeth of said toothed belt have a trapezoidally-shaped profile; and, the flank angle of said teeth of said toothed belt is in a range of 80 to 90%.

4. The linear drive of claim 1, wherein said teeth of said toothed belt have a rounded-shaped profile and a main carrying region; and, the flank angle of the mean tangent of said main carrying region lies between 80% to 90%.

5. The linear drive of claim 1, wherein the flank angle of each tooth of said second plurality of teeth is somewhat flatter than the flank angle of each corresponding tooth of said first plurality of teeth.

6. The linear drive of claim 5, wherein said flank angle of each tooth of said counterpiece is up to 5% flatter than said flank angle of each corresponding tooth of said toothed belt.

7. The linear drive of claim 1, wherein said teeth of said toothed belt have a rounded-shaped profile; and, the flank angle of each tooth of said second plurality of teeth is up to 5% flatter than the flank angle of the mean tangent of each corresponding tooth of said first plurality of teeth.

8. The linear drive of claim 1, wherein said toothed counterpiece is a rack.

9. The linear drive of claim 1, wherein said first plurality of teeth is a first set of teeth formed on the outer side of said toothed belt; said toothed belt has a second set of teeth formed on the inner side thereof; and, at least one of said direction-changing rollers is configured as a toothed wheel in meshing engagement with said second set of teeth.

10. The linear drive of claim 9, wherein said direction-changing rollers are two in number and both of said direction-changing rollers are toothed wheels.

* * * * *

UNITED STATES PATENT AND TRADEMARK OFFICE
CERTIFICATE OF CORRECTION

PATENT NO. : 6,868,747 B2
DATED : March 22, 2005
INVENTOR(S) : Hubert Goeser and Christoph Bederna It is certified that error appears in the above-identified patent and that said Letters Patent is hereby corrected as shown below:

Title page,
Item [73], Assignee, delete "ConiTech" and substitute -- ContiTech -- therefor.

Column 2,
Line 37, delete "Counterpiece," and substitute -- counterpiece, -- therefor.
Line 60, delete "end" and substitute -- and -- therefor.
Line 62, delete "protect," and substitute -- protects -- therefor.

Column 3,
Line 49, delete "se" and substitute -- se. -- therefor.

Column 4,
Line 33, delete "toothed" and substitute -- tooth -- therefor.

Signed and Sealed this

Twenty-fourth Day of May, 2005

JON W. DUDAS
*Director of the United States Patent and Trademark Office*